April 30, 1968      JESSE C. H. HWA      3,380,973

TRITHIOCARBONATION OF POLYVINYL CHLORIDE

Filed June 23, 1966      3 Sheets-Sheet 1

INVENTOR.
JESSE C.H. HWA
BY
     Wayne C. Jaeschke
     ATTORNEY

United States Patent Office 3,380,973
Patented Apr. 30, 1968

3,380,973
TRITHIOCARBONATION OF POLYVINYL CHLORIDE
Jesse C. H. Hwa, Stamford, Conn., assignor to Stauffer Chemical Company, New York, N.Y., a corporation of Delaware
Filed June 23, 1966, Ser. No. 559,893
18 Claims. (Cl. 260—79.5)

ABSTRACT OF THE DISCLOSURE

Trithiocarbonated polyvinyl chloride of the formula:

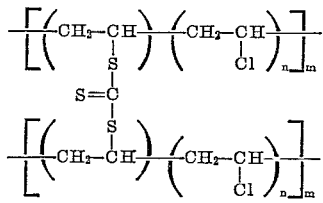

wherein $n$ and $m$ are integers between 5 and 1000 and between 1 and 20 where $(n+1)_m$ equals at least 100 respectively, are prepared by maintaining solid polymer in a solution containing a metal salt of trithiocarbonic acid and either a solvent for the polyvinyl chloride or a quaternary ammonium cationic surfactant having at least one substituent containing 10 or more carbon atoms.

---

The present invention relates to the production of trithiocarbonated polyvinyl chloride. In one aspect, the present invention relates to a novel product comprising trithiocarbonated polyvinyl chloride and, more specifically in this aspect, the present invention relates to a novel product comprising surface reacted, trithiocarbonated particles of polyvinyl chloride. In another aspect the present invention relates to method for producing trithiocarbonated polyvinyl chloride material.

The principal object of the present invention is to overcome and eliminate the disadvantages inherent in prior art polyvinyl chloride products and methods and to provide improved trithiocarbonated polyvinyl chloride products as well as an economically attractive process for making same.

It has now been discovered that an improved surface reacted, trithiocarbonated, polyvinyl chloride material is produced by the reaction of a solid vinyl chloride polymer, i.e., a polymer having a molecular weight greater than about 6,000 with a metal trithiocarbonate salt in solution such as (e.g., an aqueous solution of sodium trithiocarbonate. It has been found to be essential, in order to effect any appreciable reaction of the trithiocarbonate material and the solid polymer to effect the reaction in the presence of a chemical agent which is active with respect to the surface of the polymer. In accordance with a preferred embodiment of the process of the present invention the reaction is carried out in the presence of a solvent for polyvinyl chloride, and in accord with an alternative embodiment is carried out in the presence of certain surfactants.

The polyvinyl chloride employed in the reaction is preferably in particulate form, being prepared by any suitable polymerization method such as, e.g., suspension or emulsion polymerization. The preferred size range of the particulate polyvinyl chloride is between about 0.02 micron and about 300 microns.

The reaction can be carried out at room temperature, although it has been found to be advantageous and preferable from a rate standpoint to carry out the reaction above the softening point of the vinyl chloride polymer which is about 73° C.

In general any suitable organic solvent can be employed which permits penetration and reaction of the trithiocarbonate reactant in the region of the surface of the polyvinyl chloride. Preferably, the organic solvent is selected from the group consisting of aliphatic ketones containing a total of from 3 to 8 carbon atoms, cyclic ketones containing a total of from 5 to 8 carbon atoms, cyclic ethers containing a total of from 4 to 8 carbon atoms, dialkyl substituted amides containing from 3 to 5 carbon atoms, dimethyl sulfoxide and mixtures thereof. Cyclohexanone comprises a preferred cyclic ketone; acetone and methyl ethyl ketone comprise preferred aliphatic ketones; tetrahydrofuran and dioxane comprise preferred cyclic ethers; and dimethyl formamide, and dimethyl acetamide comprise preferred cyclic ethers for use in the process of the present invention. While lower alcohols, i.e., containing 1–3 carbon atoms and a single hydroxy function are not suitable when used alone, methanol, for example, has been found to give satisfactory results when used in admixture with other solvents such as cyclohexanone. The lower alcohol aids in making a homogeneous reaction system when employed with aqueous trithiocarbonate salt and a solvent having limited water solubility.

Preferred surfactants include cationic surfactants of the quarternary ammonium type wherein at least one of the four substituents comprises a hydrocarbon chain having 10 or more carbon atoms such as, e.g., cetyltrimethylammonium chloride which has one sixteen-carbon chain.

The trithiocarbonate salts which can be employed in the process of the present invention include alkali as well as alkaline earth metal salts, e.g., $CaCS_3$, of trithiocarbonic acid. Sodium trithiocarbonate in aqueous solution is a preferred chemical reagent in the process of the present invention.

The trithiocarbonation reaction of the present invention is a heterogeneous reaction occurring primarily on the surface of the solid polymer, e.g., the resin particles maintained in the reaction zone. It is shown that when greater surface area is presented for the reaction, e.g., by use of a larger number of smaller particles, the greater is the reaction. It is believed that the organic solvent, for example, softens the polymer surface and permits aqueous sodium trithiocarbonate, which is otherwise immiscible with and unreactive with polyvinyl chloride resin, to be introduced into and react with the polymer. The reaction between solid polyvinyl chloride and sodium trithiocarbonate in the presence of the requisite chemical agent is a simple metathesis or substitution reaction yielding, at least in part, an inter-molecular thrithiocarbonate ester group represented formulistically below:

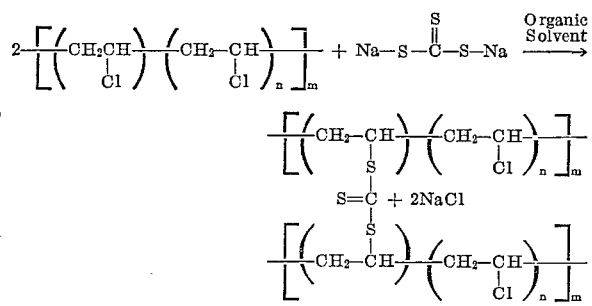

where $n$ represents an integer between about 5 and 1000 and $m$, between about 1 and 20; and where $(n+1)_m$ equals at least 100 and preferably at least about 500.

It is believed that intra-molecular trithiocarbonate ester groups, which are formulistically represented below, are likewise produced:

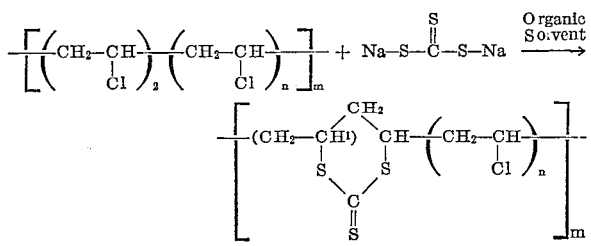

$n$ and $m$ are integers as defined above.

The degree of substitution of the trithiocarbonate group is preferably from about 0.1 up to about 15% of the chlorine atoms in the polyvinyl chloride base resin structure.

The trithiocarbonation process of the present invention is generally useful in a wide variety of commercial applications, including the upgrading of any suitable polyvinyl chloride resin, subsequent to polymerization thereof, to make products having so-called "high performance characteristics" including elevated softening point and increased stability. The process of the present invention has particular utility in improving the properties of low molecular weight, suspension-grade, extender resins. Trithiocarbonated polyvinyl chloride is useful in fabricating products including bottles, products employed out-of-doors where improved weathering properties are required, and in high speed processing applications where materials are maintained under elevated temperatures for extended periods of time. Trithiocarbonated polyvinyl chloride can also be used as an impact additive in impact polyvinyl chloride, impact poly (methyl methacrylate) and impact polystyrene.

Having thus described the invention in general terms, reference is now made to the drawings.

Figure 1:
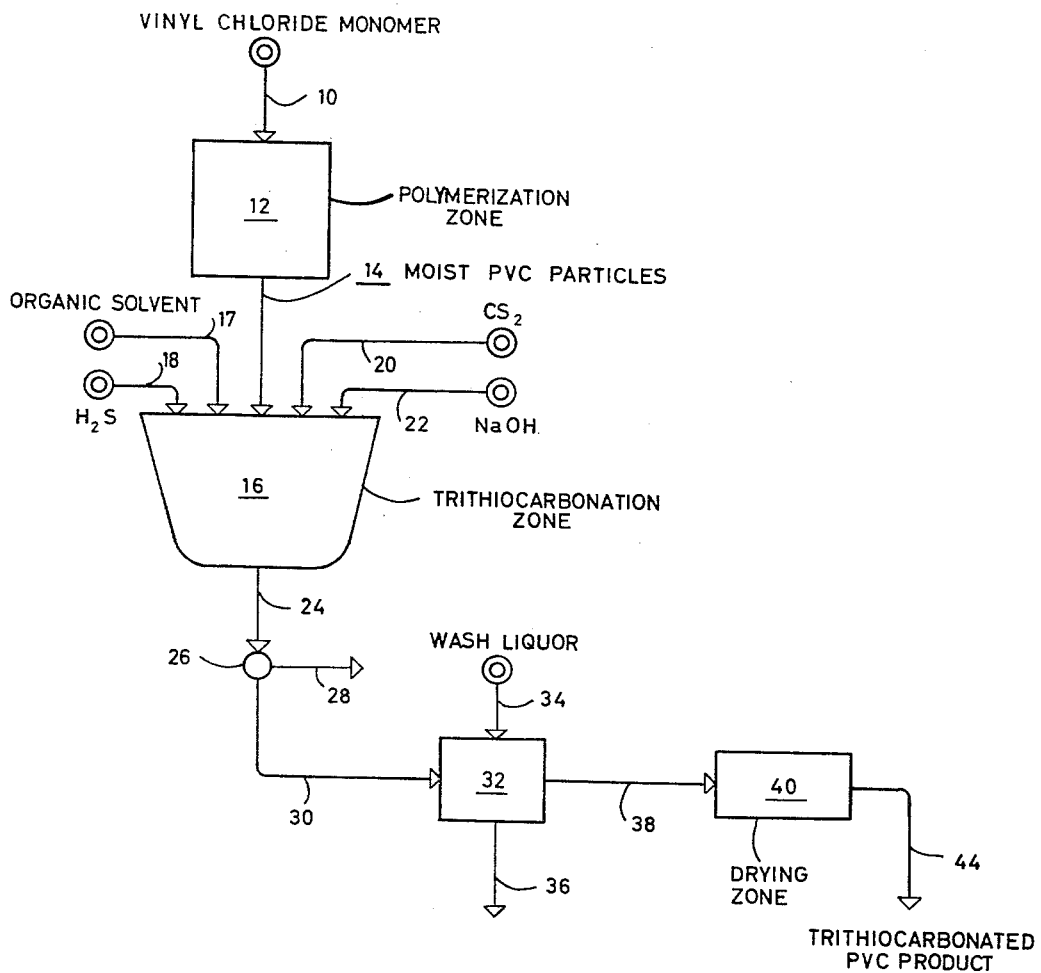
FIGURE 1 illustrates diagrammatically in elevation a preferred embodiment of the process of the present invention.

Referring now to FIGURE 1, vinyl chloride monomer is charged to polymerization zone 12 via conduit 10, in which the monomer is polymerized in accordance with a well known suspension polymerization technique such as is described in the literature, for example, in Preparative Methods of Polymer Chemistry by W. Sorenson and T. W. Cambell (Interscience, N.Y., 1961), page 166, and in U.S. Patent 2,462,422.

Moist suspension grade polyvinyl chloride (PVC) particles having a particle size range between about 50 and about 200 microns are withdrawn through conduit 14 and passed into a separate trithiocarbonation zone 16 which in this example is a heated and stirred reaction kettle. The following materials are charged into zone 16: organic solvent via line 17, hydrogen sulfide ($H_2S$) in line 18, carbon disulfide ($CS_2$) in line 20, and sodium hydroxide in line 22. In an alternative embodiment, sodium trithiocarbonate can be generated separately as shown in Example 1 and then introduced into the trithiocarbonation zone. The temperature in zone 16 is preferably maintained above about 73° C. during the reaction. The residence time of the particulate material in the reaction zone is preferably maintained between about 2 and about 18 hours; and surface crosslinked, trithiocarbonated PVC particles containing preferably between about 0.1% and about 11% sulfur by weight are obtained from zone 16. The reaction in zone 16 can be carried out in accordance with either continuous or batch processing techniques known in the art. Particulate material and reaction liquor withdrawn in line 24 is passed into separation zone 26, in which the liquor is separated and withdrawn in line 28. Particulate material is passed in line 30 to washing zone 32 for treatment against wash liquor introduced in line 34 and withdrawn in line 36. Washed particulate material is passed in line 38 to drying zone 40, wherein the final product is heated and dried. Product comprising trithiocarbonated polyvinyl chloride is withdrawn in line 44.

Example 1 illustrates the preparation of sodium trithiocarbonate employed in the subsequent examples.

Example 1.—Preparation of sodium trithiocarbonate

Charge 68 grams (2 moles) $H_2S$, 180 grams (4 moles) NaOH and 500 ml. of water into a reactor equipped with a stirrer, dropping funnel, thermometer and reflux condenser. The temperature is raised to 40° C., and carbon disulfide (167 grams; 2.2 moles) is added dropwise over a 40 minute period. The reaction is stirred at room temperature for 18 hours. During this period the carbon disulfide dissolves to form the bright orange color characteristic of sodium trithiocarbonate. Any unreacted $CS_2$ is separated.

The following Examples 2–5 illustrate trithiocarbonation of particulate polyvinyl chloride resin in accordance with the present invention. The products of trithiocarbonation in each case are yellow in color and are identified by analystical means as containing the chemically combined —$CS_3$— group.

Example 2

This example illustrates the trithiocarbonation of polyvinyl chloride in the presence of a quaternary ammonium chloride surfactant. A solution is prepared for use in this example as follows: 2 molar aqueous sodium trithiocarbonate, 119 parts; deionized water, 50 parts; methyldodecylbenzyltrimethyl ammonium chloride 0.5 part. PVC resin (hereinafter specified) is added in the amount of 15 parts to the solution which is contained in a small three necked vessel fitted with a stirrer, condenser, thermometer, heating mantle and nitrogen inlet. The resulting mixture is stirred for 3–5 hours at 80° C. The reaction products are then filtered and washed by stirring in hot water for one-half hour. This procedure is followed by stirring for about one-half hour in 0.5 N hydrochloric acid. The acid is removed by water washing until the rinse water is neutral to pH paper. The product is dried in a vacuum oven at room temperature.

Example 3

This example illustrates the trithiocarbonation of PVC in the presence of a dialkyl substituted amide. In this example a mixture is prepared in the vessel as described in Example 2: 2 molar aqueous $Na_2CS_3$, 59.5 parts; N,N-dimethylacetamide, 47.2 parts; PVC resin, 25.0 parts. The mixture in the reactor is stirred at 80° C. for 6½ hours. The washing procedure described in Example 2 is used to prepare the final product. A similar result is achieved employing the above specified procedure, when dimethyl formamide, acetone, methyl ethyl ketone or tetrahydrofuran is employed instead of the dimethylacetamide solvent of this example.

Example 4

This example illustrates the preparation of trithiocarbonated PVC employing dimethylsulfoxide as a solvent for PVC. The following mixture is prepared and charged to the vessel described in Example 2: 2 molar sodium trithiocarbonate, 53.5 parts; dimethylsulfoxide, 35.0 parts; PVC resin, 25.0 parts. The reactants are stirred for 5 hours at 80° C., and the product is washed in boiling water to remove adsorbed solvent. Acid washing and drying are effected, as described in Example 2, to obtain the final product.

Example 5

This example illustrates trithiocarbonation of PVC in a mixture of cyclohexanone and methanol which is prepared as follows: 2 molar aqueous sodium trithiocarbonate, 143 parts; methanol, 110 parts; cyclohexanone, 57 parts; PVC resin, 26.4 parts.

The above described mixture is charged to a vessel such as described in Example 2 and stirred for 7 hours at 75–80° C. A dark yellow product is filtered and washed by stirring for 1 hour in hot (60–65° C.) methanol. The washing is repeated until the methanol filtrate was colorless. The product is then washed in one-normal hydrochloric acid for one hour and the excess acid removed by repeated water washings. The final product is dried in a vacuum oven at about 40° C.

In each of the Examples 2–5, set forth above, the PVC resin which is employed is a commercial PVC resin prepared by bulk polymerization (surface area: about 2 square meters per gram).

The solubility in cyclohexanone, intrinsic viscosity, and sulfur pickup determined for the samples prepared in accordance with Examples 2–5 are set forth in Table I below:

TABLE I

| Example No. | Solubility in Cyclohexanone Compared with Unreacted Blank | Intrinsic Viscosity | Percent Sulfur |
|---|---|---|---|
| 2 | Decreased solubility | 0.77 | 0.7 |
| 3 | Decreased solubility; some gel formation. | 0.64 | 7.2 |
| 4 | Decreased solubility | | <0.1 |
| 5 | Decreased solubility; more viscous solution. | 1.34 | 1.1 |
| Blank (unreacted) | Soluble | 0.78 | 0 |

Example 6

In this example a commercial emulsion resin having a high surface area, such as the resin sold under the name Geon 121, a suspension resin of relatively low surface area such as a resin sold under the name Geon 103, and a bulk resin having high surface area such as a resin sold under the name Vinnol Y are reacted under the conditions set forth in Example 5. The effect of surface area on the extent of trithiocarbonation of PVC resin is shown in Table II below:

TABLE II.—EFFECT OF SURFACE AREA ON SODIUM TRITHIO CARBONATE TREATMENT OF PVC RESINS

| PVC Resin Type | Treatment | Color | Intrinsic Viscosity in Cyclohexanone at 30° C. Percent | Sulfur |
|---|---|---|---|---|
| Bulk, high surface area | Untreated | White | 0.78 | |
| | Treated with sodium trithiocarbonate. | Orange | 1.34 | 1.1 |
| Suspension, low surface area. | Untreated | White | 0.998 | |
| | Treated with sodium trithiocarbonate. | Light Yellow | 1.190 | <0.1 |
| Emulsion, high surface area. | Untreated | White | 1.22 | |
| | Treated with sodium trithiocarbonate. | Yellow | 1.74 | 0.5 |

The data of Table II indicate that particle size and hence surface area significantly influence the extent of the reaction of sodium trithiocarbonate and PVC. It is noted that the emulsion resin and the bulk resin, both of which have high surface area, exhibit significantly larger specific viscosity and sulfur pickup than the suspension resin of relatively lower surface area following reaction with sodium trithiocarbonate under the same reaction conditions. These data indicate that reaction of the sodium trithiocarbonate with the polyvinyl chloride is a heterogeneous one occurring at the surface rather than thoughout the polymer particle.

Examples 7 through 14

These examples which are set forth in Table III below, demonstrate the effect of the reaction time, the reaction temperature and the organic solvent on specific viscosity ($\eta_{sp}$) and sulfur pickup (percent S).

TABLE III.—TIME TEMPERATURE EFFECTS UPON TRITHIOCARBONATION OF PVC SUSPENSION RESIN

| Treatment Per 100 Parts PVC Resin | React. Temp., ° C. | React. Time, Hrs. | Percent S | *1 ($\eta_{sp}$) | Example No. |
|---|---|---|---|---|---|
| 37 Parts Na₂CS₃ 120 Cyclohexanone | 60 | 4 | <0.1 | 0.47 | 7 |
| 500 Menthanol | 60 | 6 | <0.1 | 0.47 | 8 |
| 500 Water | 60 | 22 | <0.1 | 0.53 | 9 |
| 37 Parts Na₂CS₃ 120 Cyclohexanone | 80 | 4 | <0.1 | 0.50 | 10 |
| 500 Menthanol | 80 | 6 | <0.1 | 0.52 | 11 |
| 500 Water | 80 | 22 | 0.3 | 0.53 | 12 |
| 62 Parts Na₂CS₃ 400 p-Dioxane | 80 | 5 | | 0.47 | 13 |
| 740 Water | 80 | 24 | | 0.49 | 14 |

*1 Specific viscosities of a 0.4% solution in cyclohexanone at 30° C. ($\eta_{sp}$ untreated resin=0.45).

Figure 2:
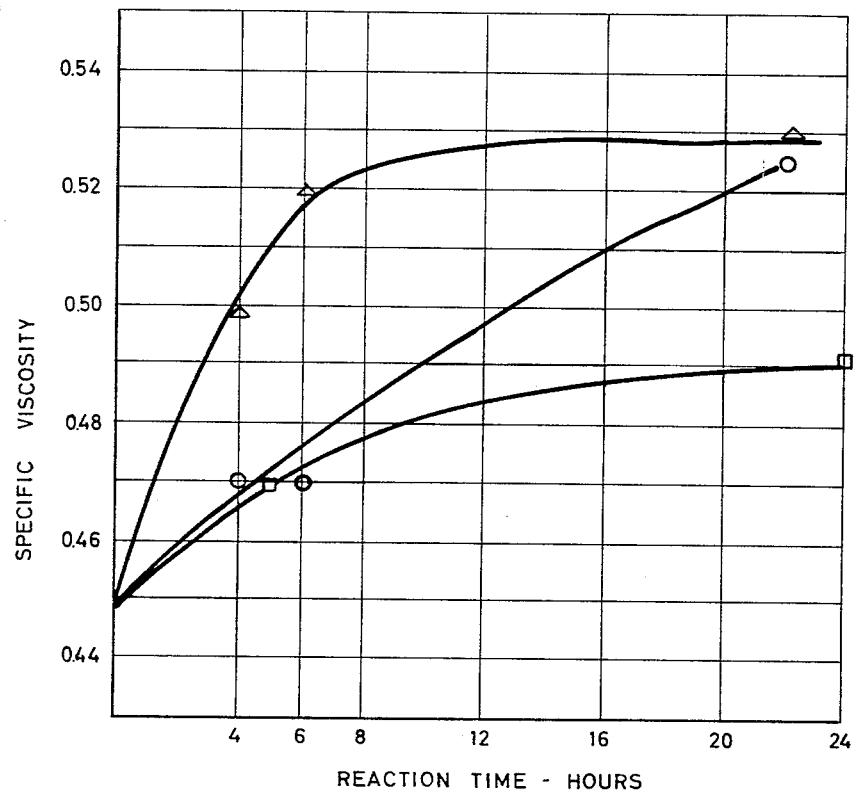
FIGURE 2 is a graphical illustration of the effect of carrying out the trithiocarbonation of a commercial polyvinyl chloride resin above its softening point contrasted with the same reaction carried out below the softening point.

The data of Table III show that, when a temperature in excess of the softening point of the base PVC resin (which is about 73° C.) is employed during the treatment, the reaction proceeds at a significantly more rapid rate. This point is graphically illustrated in FIGURE 2 of the drawings, which is a plot of Specific Viscosity versus Reaction Time (in hours) for samples which were reacted first at a temperature below the softening point and another set of samples reacted at a temperature above the glass temperature of the resin.

The product of Example 11 is found by Infra Red Analysis to have absorption at 1060 centimeters to the minus 1 and by Ultra Violet Analysis to have absorption at 278 m$\mu$. These spectroscopic absorptions correspond to the organically combined (alkyl) trithiocarbonate. It is known that Na₂CS₃ and RCS₃Na do not absorb in these regions.

Figure 3:
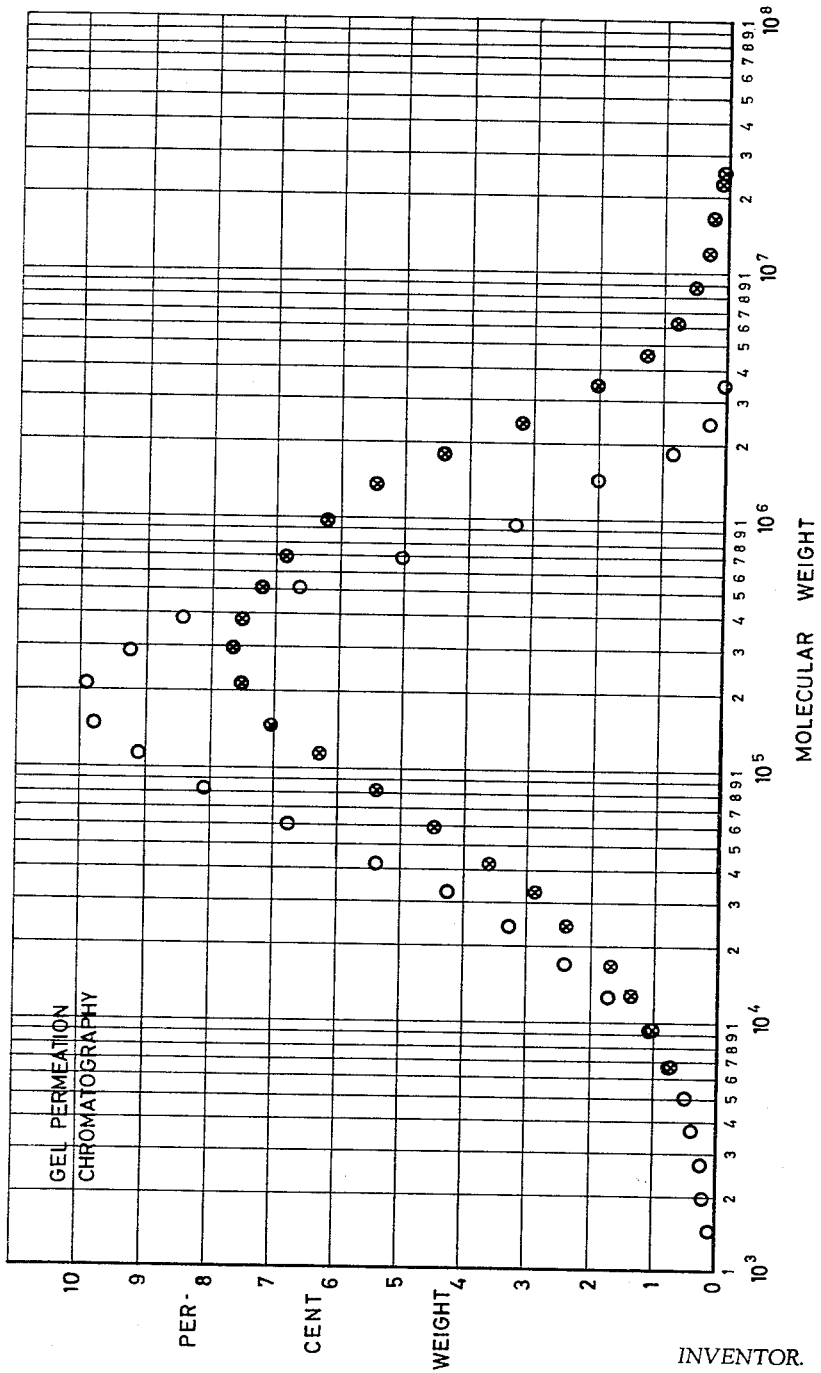
FIGURE 3 is a graphical presentation of gel permeation chromatography data showing the change in molecular weight distribution exhibited by trithiocarbonated polyvinyl chloride.

Gel permeation chromatography data showing molecular weight distributions of untreated PVC emulsion resin as compared with the same resin after trithiocarbonation in accordance with the procedure of Example 5, are presented graphically in FIGURE 3. The trithiocarbonated emulsion resin shows an increase in the high molecular weight fraction with retention of low molecular weight portion which demonstrates that the reaction is a heterogeneous one in which only the surface of the PVC resin particles are crosslinked while the interiors of the resin particles remain unchanged.

A test was performed in order to compare the thermal stability of trithiocarbonated PVC with untreated PVC resin. Accordingly, a commercial PVC resin and a trithiocarbonated PVC resin were milled at 365° F. The commercial PVC resin began to show signs of degradation after 5 minutes of the milling treatment at 365° F. whereas the trithiocarbonated material did not begin to show signs of degradation until about 15 minutes of the same milling treatment.

In order to compare the rheological properties of commercial PVC resin with trithiocarbonated PVC resin, two samples were prepared, one consisting of 100 grams of commercial PVC resin and 65 grams of dioctylphthalate plasticizers and a second sample comprising 100 grams of trithiocarbonated PVC resin and 65 grams of dioctylphthalate plasticizer. Both samples were allowed to stand under identical conditions. After 15 minutes of standing the untreated commercial resin separated out indicating undesirable rheological properties. The trithiocarbonated PVC did not separate until after about two hours. This test demonstrates improvement in the rheological properties of the trithiocarbonated PVC.

Having thus described the invention with reference to specific examples thereof, many modifications and alterations of the present invention will become apparent to those skilled in the art without departing from the scope of the present invention.

What is claimed is:

1. A product which comprises trithiocarbonated polyvinyl chloride according to the formula:

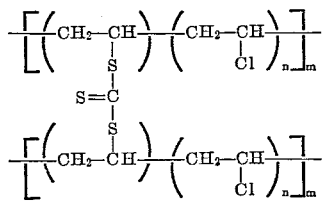

wherein $n$ and $m$ represent integers between 5 and 1000 and between 1 and 20 where $(n+1)_m$ equals at least 100 respectively.

2. The product of claim 1 in which $(n+1)_m$ equals at least about 500.

3. Improved particles of polyvinyl chloride base resin, the surfaces of which contain a minor degree of trithiocarbonate ester groups substituted for chlorine in the polyvinyl chloride base resin structure.

4. The particles of claim 2 in which the substitution is inter-molecular.

5. The particles of claim 2 in which the degree of substitution is from about 0.1 to about 15% of chlorine atoms in the polyvinyl chloride base resin.

6. The process of treating solid vinyl chloride polymer which comprises maintaining said solid polymer in a solution containing an alkaline earth metal salt of trithiocarbonic acid in the presence of a chemical agent active with respect to the surface of said polymer selected from the group consisting of a solvent for said polymer and a quaternary ammonium cationic surfactant having at least one substituent hydrocarbon group containing ten or more carbon atoms under conditions to cause trithiocarbonated ester groups to be substituted for chlorine atoms in the region of the polymer surface, said solvent for said polyvinyl chloride being selected from the group consisting of aliphatic ketones containing a total of from 3 to 8 carbon atoms, cyclic ketones containing a total of from 5 to 8 carbon atoms, cyclic ethers containing a total of from 4 to 8 carbon atoms, dialkyl substituted amides containing from 3 to 5 carbon atoms, dimethyl sulfoxide, and mixtures thereof.

7. The process of claim 6 in which said solid vinyl chloride polymer is admixed in particulate form with said solution.

8. The process of claim 6 in which said metal salt comprises an alkali metal salt of trithiocarbonic acid.

9. The process of claim 6 in which said metal salt comprises an alkaline earth metal salt of trithiocarbonic acid.

10. The process of claim 6 in which said chemical agent comprises a solvent for polyvinyl chloride.

11. The process of claim 6 in which said chemical agent comprises a quaternary ammonium cationic surfactant having at least one substituent hydrocarbon group containing ten or more carbon atoms.

12. The process of claim 6 in which the temperature of the solution is maintained above about 73° C.

13. The process of treating solid vinyl chloride polymer in particulate form which comprises admixing an aqueous solution of sodium trithiocarbonate with said particulate material and a solvent for polyvinyl chloride selected from the group consisting of aliphatic ketones containing a total of from 3 to 8 carbon atoms, cyclic ketones containing a total of from 5 to 8 carbon atoms, cyclic ethers containing a total of from 4 to 8 carbon atoms, dialkyl substituted amides containing from 3 to 5 carbon atoms dimethyl sulfoxide, and mixtures thereof and maintaining the particulate material in said solution under conditions to effect substitution of trithiocarbonate ester groups for chlorine atoms in the structure of said particulate material.

14. The process of claim 13 in which said solvent comprises cyclohexanone.

15. The process of claim 14 in which said cyclohexanone is admixed with a lower alcohol having 1–3 carbon atoms.

16. The process of claim 13 in which said solvent comprises dioxane.

17. The process of claim 13 in which said solvent comprises dimethylacetamide.

18. The process of claim 13 in which said particulate polyvinyl chloride material is the product of a suspension polymerization zone and said sodium trithiocarbonate is generated in the presence of said particulate material by the admixture of suitable quantities of sodium hydroxide, hydrogen sulfide and carbon disulfide.

References Cited

UNITED STATES PATENTS

| | | | |
|---|---|---|---|
| 2,070,443 | 2/1937 | McGahey | 260—2 |
| 2,858,292 | 10/1958 | Swart et al. | 260—45.8 |
| 2,996,473 | 8/1961 | Cain et al. | 260—92.8 |
| 3,017,379 | 1/1962 | Feild | 260—92.8 |
| 3,197,446 | 7/1965 | Ziarnik et al. | 260—79.5 |
| 3,331,817 | 7/1967 | Liggett | 260—79 |

DONALD E. CZAJA, *Primary Examiner.*

JAMES A. SEIDLECK, *Examiner.*

M. I. MARQUIS, *Assistant Examiner.*

UNITED STATES PATENT OFFICE
CERTIFICATE OF CORRECTION

Patent No. 3,380,973                      April 30, 1968

Jesse C. H. Hwa

It is certified that error appears in the above identified patent and that said Letters Patent are hereby corrected as shown below:

Columns 5 and 6, TABLE II, in the heading to the fourth column, line 6 thereof, cancel "Percent" and insert the same in the heading of column 5, line 1, before "Sulfur". Column 7, line 47, before "alkaline" insert -- alkali or --.

Signed and sealed this 30th day of September 1969.

(SEAL)
Attest:

Edward M. Fletcher, Jr.                  WILLIAM E. SCHUYLER, JR.
Attesting Officer                            Commissioner of Patents